(12) United States Patent
Brady et al.

(10) Patent No.: US 9,662,954 B2
(45) Date of Patent: May 30, 2017

(54) VEHICLE HAVING SUSPENSION WITH CONTINUOUS DAMPING CONTROL

(71) Applicant: Polaris Industries Inc., Medina, MN (US)

(72) Inventors: Louis James Brady, Wyoming, MN (US); Alex R. Scheuerell, White Bear Lake, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 14/074,340

(22) Filed: Nov. 7, 2013

(65) Prior Publication Data

US 2014/0125018 A1  May 8, 2014

Related U.S. Application Data

(60) Provisional application No. 61/723,623, filed on Nov. 7, 2012.

(51) Int. Cl.
  *B60G 17/016* (2006.01)
  *B60G 17/0165* (2006.01)
  *B60G 17/08* (2006.01)

(52) U.S. Cl.
  CPC ....... *B60G 17/016* (2013.01); *B60G 17/0165* (2013.01); *B60G 17/08* (2013.01);
  (Continued)

(58) Field of Classification Search
  CPC  B60G 17/0164; B60G 17/08; B60G 17/0162; B60G 17/0155; B60G 17/015;
  (Continued)

(56) References Cited

U.S. PATENT DOCUMENTS 3,933,213 A  1/1976  Trowbridge
4,462,480 A  7/1984  Yasui et al.
(Continued)

FOREIGN PATENT DOCUMENTS

CN  2255379 Y  6/1997
CN  2544987 Y  4/2003
(Continued)

OTHER PUBLICATIONS

International Search Report and Written Opinion issued by the European Patent Office, dated Feb. 18, 2014, for International Application No. PCT/US2013/068937; 11 pages.
(Continued)

*Primary Examiner* — Karen Beck
(74) *Attorney, Agent, or Firm* — Faegre Baker Daniels LLP (57) ABSTRACT

A damping control system for a vehicle having a suspension located between a plurality of ground engaging members and a vehicle frame includes at least one adjustable shock absorber having an adjustable damping characteristic. The system also includes a controller coupled to each adjustable shock absorber to adjust the damping characteristic of each adjustable shock absorber, and a user interface coupled to the controller and accessible to a driver of the vehicle. The user interface includes at least one user input to permit manual adjustment of the damping characteristic of the at least one adjustable shock absorber during operation of the vehicle. Vehicle sensors may also be coupled to the controller to adjust the damping characteristic of the at least one adjustable shock absorber based on sensor output signals.

34 Claims, 5 Drawing Sheets

(52) U.S. Cl.
CPC ...... *B60G 2300/07* (2013.01); *B60G 2300/32* (2013.01); *B60G 2300/322* (2013.01); *B60G 2400/102* (2013.01); *B60G 2400/204* (2013.01); *B60G 2400/252* (2013.01); *B60G 2400/33* (2013.01); *B60G 2400/39* (2013.01); *B60G 2400/40* (2013.01); *B60G 2400/61* (2013.01); *B60G 2600/02* (2013.01); *B60G 2600/04* (2013.01); *B60G 2600/20* (2013.01); *B60G 2600/70* (2013.01); *B60G 2800/014* (2013.01); *B60G 2800/162* (2013.01); *B60G 2800/916* (2013.01); *B60G 2800/94* (2013.01)

(58) Field of Classification Search
CPC ...... B60G 17/023; B60G 17/04; B60G 17/02; B60G 17/021; B60G 17/0416; B60G 2800/012; B60G 2800/97; B60G 2800/91; B60G 2800/24; B60G 2800/22; B60G 2800/014; B60G 2600/18; B60G 2600/20; B60G 2400/204; B60G 2400/102; B60G 2400/252; B60G 2400/106; B60G 2400/33; B60G 2400/30; B60G 2400/40; B60G 2400/41; B60G 17/01941
USPC ... 280/5.519, 5.513, 5.51, 5.5, 5.515, 5.507, 280/124.101, 124.102; 701/37, 38, 111
See application file for complete search history.

(56) References Cited

U.S. PATENT DOCUMENTS

| | | | |
|---|---|---|---|
| 4,600,215 A * | 7/1986 | Kuroki et al. | 280/5.519 |
| 4,722,548 A | 2/1988 | Hamilton et al. | |
| 4,749,210 A * | 6/1988 | Sugasawa | 280/5.519 |
| 4,779,895 A | 10/1988 | Rubel | |
| 4,826,205 A | 5/1989 | Kouda et al. | |
| 4,827,416 A | 5/1989 | Kawagoe et al. | |
| 4,867,474 A | 9/1989 | Smith | |
| 4,927,170 A | 5/1990 | Wada | |
| 4,934,667 A | 6/1990 | Pees et al. | |
| 4,949,989 A * | 8/1990 | Kakizaki et al. | 280/5.519 |
| 5,015,009 A | 5/1991 | Ohyama et al. | |
| 5,024,460 A | 6/1991 | Hanson et al. | |
| 5,062,657 A | 11/1991 | Majeed | |
| 5,071,157 A * | 12/1991 | Majeed | 280/5.515 |
| 5,080,392 A | 1/1992 | Bazergui | |
| 5,163,538 A | 11/1992 | Derr et al. | |
| 5,189,615 A | 2/1993 | Rubel et al. | |
| 5,342,023 A | 8/1994 | Kuriki et al. | |
| 5,350,187 A | 9/1994 | Shinozaki | |
| 5,361,209 A * | 11/1994 | Tsutsumi | 701/37 |
| 5,361,213 A * | 11/1994 | Fujieda et al. | 701/111 |
| 5,366,236 A | 11/1994 | Kuriki et al. | |
| 5,377,107 A * | 12/1994 | Shimizu et al. | 701/37 |
| 5,390,121 A | 2/1995 | Wolfe | |
| 5,475,596 A | 12/1995 | Henry et al. | |
| 5,483,448 A | 1/1996 | Liubakka et al. | |
| 5,550,739 A | 8/1996 | Hoffmann et al. | |
| 5,586,032 A * | 12/1996 | Kallenbach et al. | 701/45 |
| 5,632,503 A * | 5/1997 | Raad et al. | 280/5.503 |
| 5,678,847 A | 10/1997 | Izawa et al. | |
| 6,000,702 A | 12/1999 | Streiter | |
| 6,032,752 A | 3/2000 | Karpik et al. | |
| 6,070,681 A | 6/2000 | Catanzarite et al. | |
| 6,078,252 A * | 6/2000 | Kulczycki et al. | 340/425.5 |
| 6,112,866 A | 9/2000 | Boichot et al. | |
| 6,155,545 A * | 12/2000 | Noro | B60G 15/063 188/322.16 |
| 6,161,908 A | 12/2000 | Takayama et al. | |
| 6,181,997 B1 | 1/2001 | Badenoch | |
| 6,206,124 B1 | 3/2001 | Mallette et al. | |
| 6,244,398 B1 * | 6/2001 | Girvin | B60G 17/01941 188/282.5 |
| 6,249,728 B1 | 6/2001 | Streiter | |
| 6,352,142 B1 | 3/2002 | Kim | |
| 6,370,458 B1 | 4/2002 | Shal et al. | |
| 6,507,778 B2 | 1/2003 | Koh | |
| 6,604,034 B1 | 8/2003 | Speck et al. | |
| 6,685,174 B2 | 2/2004 | Behmenburg et al. | |
| 6,752,401 B2 | 6/2004 | Burdock | |
| 6,834,736 B2 | 12/2004 | Kramer et al. | |
| 6,851,679 B2 | 2/2005 | Downey et al. | |
| 6,895,318 B1 * | 5/2005 | Barton et al. | 701/42 |
| 6,942,050 B1 | 9/2005 | Honkala et al. | |
| 6,945,541 B2 | 9/2005 | Brown | |
| 6,976,689 B2 | 12/2005 | Hibbert | |
| 7,011,174 B1 | 3/2006 | James | |
| 7,032,895 B2 | 4/2006 | Folchert | |
| 7,035,836 B2 | 4/2006 | Caponetto et al. | |
| 7,070,012 B2 | 7/2006 | Fecteau | |
| 7,076,351 B2 | 7/2006 | Hamilton et al. | |
| 7,097,166 B2 | 8/2006 | Folchert | |
| 7,124,865 B2 | 10/2006 | Turner et al. | |
| 7,136,729 B2 | 11/2006 | Salman et al. | |
| 7,140,619 B2 | 11/2006 | Hrovat et al. | |
| 7,168,709 B2 | 1/2007 | Niwa et al. | |
| 7,233,846 B2 * | 6/2007 | Kawauchi et al. | 701/37 |
| 7,234,707 B2 | 6/2007 | Green et al. | |
| 7,270,335 B2 | 9/2007 | Hio et al. | |
| 7,286,919 B2 | 10/2007 | Nordgren et al. | |
| 7,322,435 B2 | 1/2008 | Lillbacka et al. | |
| 7,359,787 B2 | 4/2008 | Ono et al. | |
| 7,386,378 B2 | 6/2008 | Lauwerys et al. | |
| 7,401,794 B2 | 7/2008 | Laurent et al. | |
| 7,421,954 B2 | 9/2008 | Bose | |
| 7,427,072 B2 | 9/2008 | Brown | |
| 7,441,789 B2 | 10/2008 | Geiger et al. | |
| 7,483,775 B2 | 1/2009 | Karaba et al. | |
| 7,510,060 B2 | 3/2009 | Izawa et al. | |
| 7,526,665 B2 | 4/2009 | Kim et al. | |
| 7,533,750 B2 | 5/2009 | Simmons et al. | |
| 7,533,890 B2 | 5/2009 | Chiao | |
| 7,571,039 B2 | 8/2009 | Chen et al. | |
| 7,600,762 B2 | 10/2009 | Yasui et al. | |
| 7,611,154 B2 | 11/2009 | Delaney | |
| 7,630,807 B2 | 12/2009 | Yoshimura et al. | |
| 7,641,208 B1 | 1/2010 | Barron et al. | |
| 7,644,934 B2 | 1/2010 | Mizuta | |
| 7,684,911 B2 | 3/2010 | Seifert et al. | |
| 7,740,256 B2 | 6/2010 | Davis | |
| 7,751,959 B2 | 7/2010 | Boon et al. | |
| 7,778,741 B2 | 8/2010 | Rao et al. | |
| 7,810,818 B2 | 10/2010 | Bushko | |
| 7,823,891 B2 | 11/2010 | Bushko et al. | |
| 7,862,061 B2 | 1/2011 | Jung | |
| 7,885,750 B2 | 2/2011 | Lu | |
| 7,899,594 B2 | 3/2011 | Messih et al. | |
| 7,912,610 B2 | 3/2011 | Saito et al. | |
| 7,926,822 B2 | 4/2011 | Ohletz et al. | |
| 7,940,383 B2 | 5/2011 | Noguchi et al. | |
| 7,942,427 B2 | 5/2011 | Lloyd | |
| 7,950,486 B2 | 5/2011 | Van Bronkhorst et al. | |
| 7,959,163 B2 | 6/2011 | Beno et al. | |
| 7,962,261 B2 | 6/2011 | Bushko et al. | |
| 7,963,529 B2 | 6/2011 | Oteman et al. | |
| 7,970,512 B2 | 6/2011 | Lu et al. | |
| 7,975,794 B2 | 7/2011 | Simmons | |
| 7,984,915 B2 | 7/2011 | Post, II et al. | |
| 8,005,596 B2 | 8/2011 | Lu et al. | |
| 8,027,775 B2 | 9/2011 | Takenaka et al. | |
| 8,032,281 B2 | 10/2011 | Bujak et al. | |
| 8,050,818 B2 | 11/2011 | Mizuta | |
| 8,050,857 B2 | 11/2011 | Lu et al. | |
| 8,056,392 B2 | 11/2011 | Ryan et al. | |
| 8,065,054 B2 | 11/2011 | Tarasinski et al. | |
| 8,075,002 B1 * | 12/2011 | Pionke et al. | 280/5.5 |
| 8,086,371 B2 | 12/2011 | Furuichi et al. | |
| 8,087,676 B2 | 1/2012 | McIntyre | |
| 8,095,268 B2 | 1/2012 | Parison et al. | |
| 8,108,104 B2 | 1/2012 | Hrovat et al. | |
| 8,113,521 B2 * | 2/2012 | Lin et al. | 280/5.507 |
| 8,116,938 B2 | 2/2012 | Itagaki et al. | |
| 8,121,757 B2 * | 2/2012 | Song et al. | 701/37 |

(56) References Cited

U.S. PATENT DOCUMENTS

| | | |
|---|---|---|
| 8,170,749 B2 | 5/2012 | Mizuta |
| 8,190,327 B2* | 5/2012 | Poilbout ........................ 701/37 |
| 8,195,361 B2 | 6/2012 | Kajino |
| 8,209,087 B2 | 6/2012 | Hagglund et al. |
| 8,214,106 B2 | 7/2012 | Ghoneim et al. |
| 8,219,262 B2 | 7/2012 | Stiller |
| 8,229,642 B2* | 7/2012 | Post et al. ........................ 701/91 |
| 8,260,496 B2 | 9/2012 | Gagliano |
| 8,271,175 B2 | 9/2012 | Takenaka et al. |
| 8,296,010 B2 | 10/2012 | Hirao et al. |
| 8,308,170 B2 | 11/2012 | Van Der Knaap et al. |
| 8,315,764 B2 | 11/2012 | Chen et al. |
| 8,321,088 B2 | 11/2012 | Brown et al. |
| 8,322,497 B2 | 12/2012 | Marjoram et al. |
| 8,352,143 B2 | 1/2013 | Lu et al. |
| 8,355,840 B2 | 1/2013 | Ammon et al. |
| 8,374,748 B2 | 2/2013 | Jolly |
| 8,376,373 B2 | 2/2013 | Conradie |
| 8,396,627 B2 | 3/2013 | Jung et al. |
| 8,417,417 B2 | 4/2013 | Chen et al. |
| 8,424,832 B2 | 4/2013 | Robbins et al. |
| 8,434,774 B2 | 5/2013 | LeClerc et al. |
| 8,442,720 B2 | 5/2013 | Lu et al. |
| 8,444,161 B2 | 5/2013 | LeClerc et al. |
| 8,447,489 B2 | 5/2013 | Murata et al. |
| 8,457,841 B2 | 6/2013 | Knoll et al. |
| 8,473,157 B2 | 6/2013 | Savaresi et al. |
| 8,517,395 B2 | 8/2013 | Knox et al. |
| 8,548,678 B2 | 10/2013 | Ummethala et al. |
| 8,550,221 B2 | 10/2013 | Paulides et al. |
| 8,573,605 B2 | 11/2013 | Di Maria |
| 8,626,388 B2 | 1/2014 | Oikawa |
| 8,626,389 B2 | 1/2014 | Sidlosky |
| 8,641,052 B2 | 2/2014 | Kondo et al. |
| 8,645,024 B2 | 2/2014 | Daniels |
| 8,666,596 B2* | 3/2014 | Arenz ........................ 701/37 |
| 8,672,106 B2 | 3/2014 | Laird et al. |
| 8,672,337 B2 | 3/2014 | van der Knaap et al. |
| 8,676,440 B2 | 3/2014 | Watson |
| 8,682,530 B2 | 3/2014 | Nakamura |
| 8,700,260 B2 | 4/2014 | Jolly et al. |
| 8,712,599 B1 | 4/2014 | Westpfahl |
| 8,712,639 B2 | 4/2014 | Lu et al. |
| 8,718,872 B2 | 5/2014 | Hirao et al. |
| 8,725,351 B1 | 5/2014 | Selden et al. |
| 8,731,774 B2 | 5/2014 | Yang |
| 8,770,594 B2 | 7/2014 | Tominaga et al. |
| 9,027,937 B2 | 5/2015 | Ryan et al. |
| 9,038,791 B2* | 5/2015 | Marking ............... B60G 13/08 188/314 |
| 2001/0005803 A1 | 6/2001 | Cochofel et al. |
| 2001/0021887 A1* | 9/2001 | Obradovich et al. ............. 701/1 |
| 2002/0082752 A1* | 6/2002 | Obradovich ....................... 701/1 |
| 2003/0125857 A1 | 7/2003 | Madau et al. |
| 2003/0200016 A1* | 10/2003 | Spillane et al. ............... 701/36 |
| 2003/0205867 A1 | 11/2003 | Coelingh et al. |
| 2004/0010383 A1 | 1/2004 | Lu et al. |
| 2004/0041358 A1 | 3/2004 | Hrovat et al. |
| 2004/0090020 A1 | 5/2004 | Braswell |
| 2004/0094912 A1 | 5/2004 | Niwa et al. |
| 2004/0107591 A1* | 6/2004 | Cuddy ........................ 33/370 |
| 2005/0098964 A1 | 5/2005 | Brown |
| 2005/0131604 A1 | 6/2005 | Lu |
| 2005/0267663 A1* | 12/2005 | Naono et al. ..................... 701/48 |
| 2005/0279244 A1 | 12/2005 | Bose |
| 2005/0280219 A1 | 12/2005 | Brown |
| 2006/0017240 A1 | 1/2006 | Laurent et al. |
| 2006/0064223 A1 | 3/2006 | Voss |
| 2006/0278197 A1 | 12/2006 | Takamatsu et al. |
| 2006/0284387 A1* | 12/2006 | Klees ........................ 280/5.519 |
| 2007/0050095 A1* | 3/2007 | Nelson et al. ..................... 701/1 |
| 2007/0073461 A1 | 3/2007 | Fielder |
| 2007/0120332 A1 | 5/2007 | Bushko et al. |
| 2007/0158920 A1 | 7/2007 | Delaney |
| 2007/0255466 A1* | 11/2007 | Chiao ........................ 701/37 |
| 2008/0059034 A1 | 3/2008 | Lu |
| 2008/0119984 A1 | 5/2008 | Hrovat |
| 2008/0172155 A1 | 7/2008 | Takamatsu et al. |
| 2008/0183353 A1* | 7/2008 | Post et al. ........................ 701/42 |
| 2008/0243334 A1 | 10/2008 | Bujak |
| 2008/0243336 A1 | 10/2008 | Fitzgibbons |
| 2008/0275606 A1 | 11/2008 | Tarasinski et al. |
| 2009/0037051 A1 | 2/2009 | Shimizu et al. |
| 2009/0093928 A1 | 4/2009 | Getman et al. |
| 2009/0108546 A1 | 4/2009 | Ohletz et al. |
| 2009/0240427 A1* | 9/2009 | Siereveld et al. ............. 701/201 |
| 2009/0261542 A1 | 10/2009 | McIntyre |
| 2010/0017059 A1 | 1/2010 | Lu et al. |
| 2010/0057297 A1 | 3/2010 | Itagaki et al. |
| 2010/0059964 A1* | 3/2010 | Morris ................... B62K 25/08 280/283 |
| 2010/0109277 A1* | 5/2010 | Furrer ................... B60G 17/08 280/124.161 |
| 2010/0121529 A1 | 5/2010 | Savaresi et al. |
| 2010/0152969 A1 | 6/2010 | Li et al. |
| 2010/0211261 A1 | 8/2010 | Sasaki et al. |
| 2010/0230876 A1 | 9/2010 | Inoue et al. |
| 2010/0238129 A1* | 9/2010 | Nakanishi et al. ........... 345/173 |
| 2010/0252972 A1 | 10/2010 | Cox et al. |
| 2010/0253018 A1 | 10/2010 | Peterson |
| 2010/0259018 A1 | 10/2010 | Honig et al. |
| 2010/0301571 A1 | 12/2010 | van der Knaap et al. |
| 2011/0035089 A1 | 2/2011 | Hirao et al. |
| 2011/0035105 A1 | 2/2011 | Jolly |
| 2011/0074123 A1 | 3/2011 | Fought et al. |
| 2011/0109060 A1 | 5/2011 | Earle et al. |
| 2011/0153158 A1 | 6/2011 | Acocella |
| 2011/0166744 A1 | 7/2011 | Lu |
| 2012/0029770 A1 | 2/2012 | Hirao et al. |
| 2012/0053790 A1 | 3/2012 | Oikawa |
| 2012/0053791 A1 | 3/2012 | Harada |
| 2012/0078470 A1 | 3/2012 | Hirao et al. |
| 2012/0119454 A1 | 5/2012 | Di Maria |
| 2012/0139328 A1* | 6/2012 | Brown et al. .................... 303/3 |
| 2012/0168268 A1 | 7/2012 | Bruno et al. |
| 2012/0222927 A1* | 9/2012 | Marking ................... F16F 9/42 188/274 |
| 2012/0247888 A1 | 10/2012 | Chikuma et al. |
| 2012/0265402 A1 | 10/2012 | Post, II et al. |
| 2012/0277953 A1* | 11/2012 | Savaresi et al. ................. 701/38 |
| 2013/0009350 A1 | 1/2013 | Wolf-Monheim |
| 2013/0018559 A1* | 1/2013 | Epple et al. ..................... 701/70 |
| 2013/0030650 A1 | 1/2013 | Norris et al. |
| 2013/0041545 A1 | 2/2013 | Bar et al. |
| 2013/0060423 A1 | 3/2013 | Jolly |
| 2013/0060444 A1 | 3/2013 | Matsunaga et al. |
| 2013/0074487 A1 | 3/2013 | Herold et al. |
| 2013/0079988 A1* | 3/2013 | Hirao et al. ..................... 701/38 |
| 2013/0103259 A1 | 4/2013 | Eng et al. |
| 2013/0158799 A1 | 6/2013 | Kamimura |
| 2013/0161921 A1 | 6/2013 | Cheng et al. |
| 2013/0190980 A1 | 7/2013 | Ramirez Ruiz |
| 2013/0197732 A1 | 8/2013 | Pearlman et al. |
| 2013/0197756 A1 | 8/2013 | Ramirez Ruiz |
| 2013/0218414 A1 | 8/2013 | Meitinger et al. |
| 2013/0226405 A1 | 8/2013 | Koumura et al. |
| 2013/0261893 A1 | 10/2013 | Yang |
| 2013/0304299 A1 | 11/2013 | Daniels |
| 2013/0328277 A1* | 12/2013 | Ryan et al. ................. 280/5.519 |
| 2013/0334394 A1 | 12/2013 | Parison, Jr. et al. |
| 2013/0338869 A1 | 12/2013 | Tsumano |
| 2013/0341143 A1 | 12/2013 | Brown |
| 2013/0345933 A1 | 12/2013 | Norton et al. |
| 2014/0001717 A1 | 1/2014 | Giovanardi et al. |
| 2014/0005888 A1 | 1/2014 | Bose et al. |
| 2014/0012467 A1 | 1/2014 | Knox et al. |
| 2014/0046539 A1* | 2/2014 | Wijffels et al. ................. 701/36 |
| 2014/0058606 A1 | 2/2014 | Hilton |
| 2014/0095022 A1 | 4/2014 | Cashman et al. |
| 2014/0129083 A1 | 5/2014 | O'Connor Gibson et al. |
| 2014/0131971 A1 | 5/2014 | Hou |
| 2014/0136048 A1* | 5/2014 | Ummethala et al. ........ 701/33.1 |
| 2014/0156143 A1 | 6/2014 | Evangelou et al. |
| 2014/0167372 A1 | 6/2014 | Kim et al. |

(56) References Cited

U.S. PATENT DOCUMENTS

| | | |
|---|---|---|
| 2014/0316653 A1 | 10/2014 | Kikuchi |
| 2014/0353933 A1 | 12/2014 | Hawksworth et al. |
| 2014/0358373 A1 | 12/2014 | Kikuchi et al. |
| 2015/0039199 A1 | 2/2015 | Kikuchi |
| 2015/0057885 A1* | 2/2015 | Brady et al. .................... 701/38 |
| 2015/0081170 A1 | 3/2015 | Kikuchi |

FOREIGN PATENT DOCUMENTS

| | | |
|---|---|---|
| CN | 1660615 A | 8/2005 |
| CN | 1746803 A | 3/2006 |
| CN | 1749048 A | 3/2006 |
| CN | 1810530 A | 8/2006 |
| CN | 101549626 A | 10/2009 |
| CN | 201723635 U | 1/2011 |
| CN | 201914049 U | 8/2011 |
| CN | 202040257 U | 11/2011 |
| CN | 102069813 B | 6/2012 |
| CN | 102616104 A | 8/2012 |
| CN | 102627063 A | 8/2012 |
| CN | 102678808 A | 9/2012 |
| CN | 102729760 A | 10/2012 |
| CN | 202468817 U | 10/2012 |
| CN | 102168732 B | 11/2012 |
| CN | 102840265 A | 12/2012 |
| DE | 19508302 A1 | 9/1996 |
| DE | 19922745 A1 | 12/2000 |
| DE | 102010020544 A1 * | 1/2011 |
| EP | 0 403 803 B1 | 7/1992 |
| EP | 0 398 804 B1 | 2/1993 |
| EP | 0 405 123 B1 | 10/1993 |
| EP | 0 473 766 B1 | 2/1994 |
| EP | 0 546 295 B1 | 4/1996 |
| EP | 5441 108 B1 | 7/1996 |
| EP | 544108 B1 | 7/1996 |
| EP | 0 691 226 B1 | 12/1998 |
| EP | 1 172 239 A2 | 1/2001 |
| EP | 1172239 A2 * | 1/2002 ........... B60G 17/015 |
| EP | 1 219 475 A1 | 7/2002 |
| EP | 1 164 897 B1 | 2/2005 |
| EP | 2 123 933 A2 | 11/2009 |
| EP | 2216191 (A1) | 8/2010 |
| EP | 2268496 (B1) | 1/2011 |
| EP | 2 517 904 A9 | 3/2013 |
| EP | 1 449 688 B1 | 6/2014 |
| FR | 2935642 A3 | 3/2010 |
| IN | 20130233813 | 8/2014 |
| JP | 2155815 | 6/1990 |
| JP | 4368211 | 12/1992 |
| JP | 5178055 | 7/1993 |
| JP | 6156036 A | 6/1994 |
| JP | 7117433 A | 5/1995 |
| JP | 02898949 B2 | 6/1999 |
| JP | 2001018623 A | 1/2001 |
| JP | 03137209 B2 | 2/2001 |
| JP | 2001 121939 A | 5/2001 |
| JP | 20011291939 A | 5/2001 |
| JP | 2002219921 A | 8/2002 |
| JP | 2009035220 A | 2/2009 |
| JP | 2009160964 A | 7/2009 |
| JP | 2011126405 A | 6/2011 |
| JP | 05149443 B2 | 2/2013 |
| JP | 2013173490 (A) | 9/2013 |
| JP | 2013189109 (A) | 9/2013 |
| WO | WO92/10693 A1 | 6/1992 |
| WO | WO99/59860 | 11/1999 |
| WO | WO2015004676 (A1) | 1/2005 |

OTHER PUBLICATIONS

International Preliminary Report on Patentability issued by the International Bureau of WIPO, dated May 12, 2015, for International Application No. PCT/US2013/068937; 7 pages.

* cited by examiner

VEHICLE HAVING SUSPENSION WITH CONTINUOUS DAMPING CONTROL

CROSS REFERENCE TO RELATED APPLICATION

This application claims the benefit of U.S. Application Ser. No. 61/723,623, filed on Nov. 7, 2012, which is expressly incorporated herein by reference.

BACKGROUND AND SUMMARY OF THE DISCLOSURE

The present disclosure relates to improved suspension for a vehicle having continuous "on-the-go" damping control for shock absorbers. Currently some off-road vehicles include adjustable shock absorbers. These adjustments include spring preload, high and low speed compression damping and/or rebound damping. In order to make these adjustments, the vehicle is stopped and the operator makes an adjustment at each shock absorber location on the vehicle. A tool is often required for the adjustment. Some on-road automobiles also include adjustable electric shocks along with sensors for active ride control systems. However, these systems are normally controlled by a computer and are focused on vehicle stability instead of ride comfort. The system of the present disclosure allows an operator to make real time "on-the-go" adjustments to the shocks to obtain the most comfortable ride for given terrain and payload scenarios.

Vehicles often have springs (coil, leaf, or air) at each wheel, track, or ski to support a majority of the load. The vehicle of the present disclosure also has electronic shocks controlling the dynamic movement of each wheel, ski, or track. The electronic shocks have a valve that controls the damping force of each shock. This valve may control compression damping only, rebound damping only, or a combination of compression and rebound damping. The valve is connected to a controller having a user interface that is within the driver's reach for adjustment while operating the vehicle. In one embodiment, the controller increases or decreases the damping of the shock absorbers based on user inputs received from an operator. In another embodiment, the controller has several preset damping modes for selection by the operator. The controller may also be coupled to sensors on the suspension and chassis to provide an actively controlled damping system.

According to one illustrated embodiment of the present disclosure, a damping control system is provided for a vehicle having a suspension located between a plurality of ground engaging members and a vehicle frame. The damping control system includes a plurality of springs coupled between the ground engaging members and the frame, and a plurality of shock absorbers coupled between the ground engaging members and the frame. At least one of the plurality of shock absorbers is an adjustable shock absorber having an adjustable damping characteristic. The system also includes a controller coupled to each adjustable shock absorber to adjust the damping characteristic of each adjustable shock absorber, and a user interface coupled to the controller and accessible to a driver of the vehicle. The user interface includes at least one user input to permit manual adjustment of the damping characteristic of the at least one adjustable shock absorber during operation of the vehicle.

According to an illustrated embodiment of the present disclosure, the system also includes at least one sensor selected from a vehicle speed sensor, a steering sensor, an accelerometer, a brake sensor, a throttle position sensor, a wheel speed sensor and a gear selection sensor. The at least one sensor has an output signal coupled to the controller. The controller uses the sensor output signals to adjust the damping characteristics of the at least one adjustable shock absorber based on driving conditions of the vehicle. Therefore, in this embodiment, the system is semi-active and uses the manual user inputs from the user interface combined with vehicle sensors output signals to control the damping characteristics of the adjustable shock absorbers. For example, the controller may set a damping characteristic adjustment range for the at least one adjustable shock absorber. The least one user input of the user interface then provides a manual adjustment of the damping characteristic of the at least one adjustable shock absorber within the damping characteristic adjustment range.

According to another illustrated embodiment of the present disclosure, the user interface provides a plurality of driving condition modes. Each driving condition mode has different damping characteristics for the at least one adjustable shock absorber based on a type of road or off-road trail on which the vehicle is expected to travel. The user input permits selection of one of the driving condition modes, and the controller automatically adjusts damping characteristics of the at least one adjustable shock absorber based upon the selected driving condition mode.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The foregoing aspects and many additional features of the present system and method will become more readily appreciated and become better understood by reference to the following detailed description when taken in conjunction with the accompanying drawings.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure.

DETAILED DESCRIPTION OF THE DRAWINGS

For the purposes of promoting an understanding of the principles of the present disclosure, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It is understood that no limitation of the scope of the invention is thereby intended. The invention includes any alterations and further modifications in the illustrated devices and described methods and further applications of the principles of the invention which would normally occur to one skilled in the art to which the invention relates.

Figure 1:
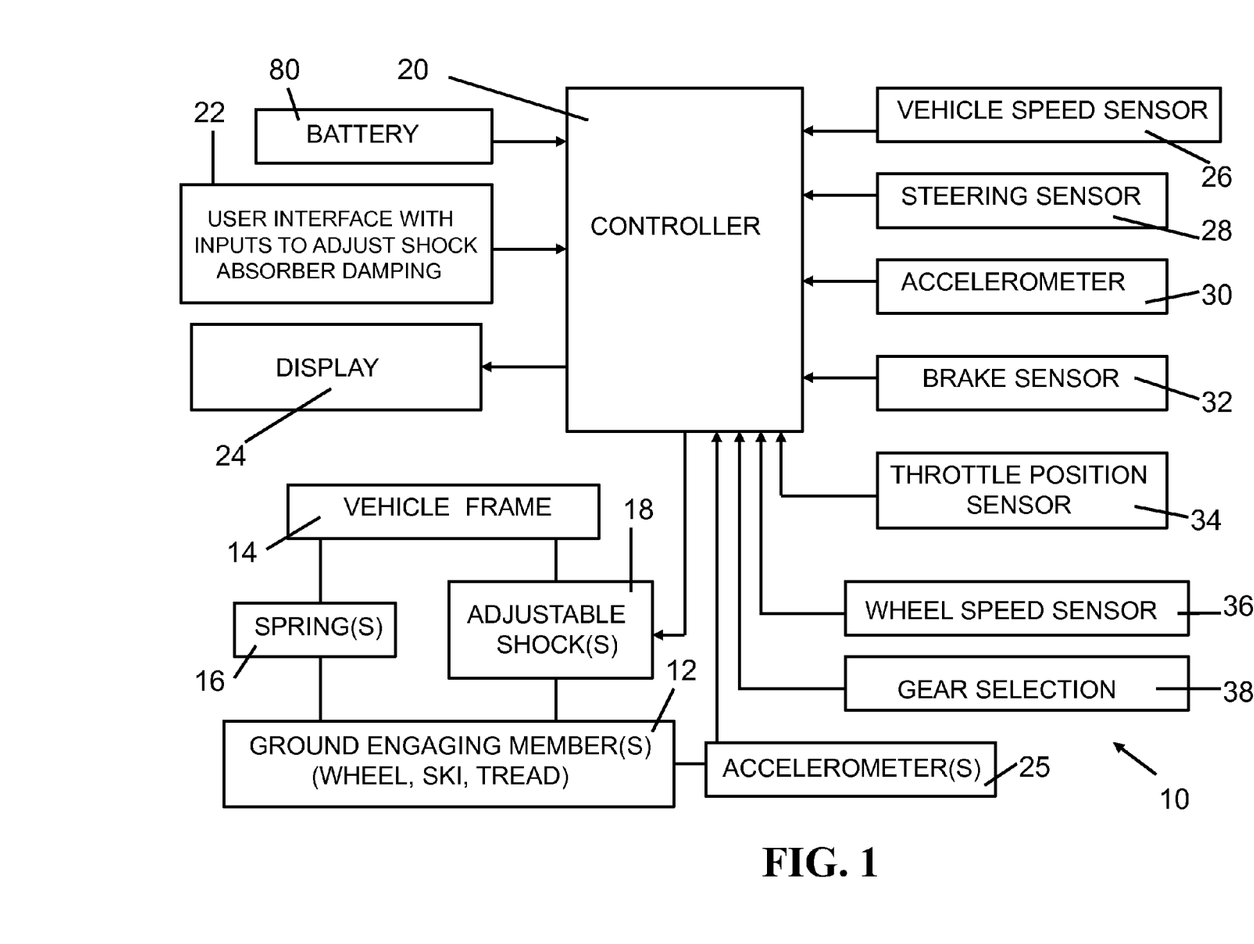
FIG. 1 is a block diagram illustrating components of a vehicle of the present disclosure having a suspension with a plurality of continuous damping control shock absorbers and a plurality of sensors integrated with the continuous damping controller.

Referring now to FIG. 1, the present disclosure relates to a vehicle 10 having a suspension located between a plurality of ground engaging members 12 and a vehicle frame 14. The ground engaging members 12 include wheels, skis, guide tracks, treads or the like. The suspension typically includes springs 16 and shock absorbers 18 coupled between the ground engaging members 12 and the frame 14. The springs 16 may include, for example, coil springs, leaf springs, air springs or other gas springs. The air or gas springs 16 may be adjustable. See, for example, U.S. Pat. No. 7,950,486 incorporated herein by reference. The springs 16 are often coupled between the vehicle frame 14 and the ground engaging members 12 through an A-arm linkage 70 (See FIG. 5) or other type linkage. Adjustable shock absorbers 18 are also coupled between the ground engaging members 12 and the vehicle frame 14. An illustrating embodiment, a spring 16 and shock 18 are located adjacent each of the ground engaging members 12. In an ATV, for example, four springs 16 and adjustable shocks 18 are provided adjacent each wheel 12. Some manufacturers offer adjustable springs 16 in the form of either air springs or hydraulic preload rings. These adjustable springs 16 allow the operator to adjust the ride height on the go. However, a majority of ride comfort comes from the damping provided by shock absorbers 18.

In an illustrated embodiment, the adjustable shocks 18 are electrically controlled shocks for adjusting damping characteristics of the shocks 18. A controller 20 provides signals to adjust damping of the shocks 18 in a continuous or dynamic manner. The adjustable shocks 18 may be adjusted to provide differing compression damping, rebound damping or both.

In an illustrated embodiment of the present disclosure, a user interface 22 is provided in a location easily accessible to the driver operating the vehicle. Preferably, the user interface 22 is either a separate user interface mounted adjacent the driver's seat on the dashboard or integrated onto a display within the vehicle. User interface 22 includes user inputs to allow the driver or a passenger to manually adjust shock absorber 18 damping during operation of the vehicle based on road conditions that are encountered. In another illustrated embodiment, the user inputs are on a steering wheel, handle bar, or other steering control of the vehicle to facilitate actuation of the damping adjustment. A display 24 is also provided on or next to the user interface 22 or integrated into a dashboard display of the vehicle to display information related to the shock absorber damping settings.

In an illustrated embodiment, the adjustable shock absorbers 18 are model number CDC (continuous damping control) electronically controlled shock absorbers available from ZF Sachs Automotive. See Causemann, Peter; *Automotive Shock Absorbers: Features, Designs, Applications*, ISBN 3-478-93230-0, Verl. Moderne Industrie, Second Edition, 2001, pages 53-63, incorporated by reference herein for a description of the basic operation of the shock absorbers 18 in the illustrated embodiment. It is understood that this description is not limiting and there are other suitable types of shock absorbers available from other manufacturers.

The controller 20 receives user inputs from the user interface 22 and adjusts the damping characteristics of the adjustable shocks 18 accordingly. As discussed below, the user can independently adjust front and rear shock absorbers 18 to adjust the ride characteristics of the vehicle. In certain other embodiments, each of the shocks 18 is independently adjustable so that the damping characteristics of the shocks 18 are changed from one side of the vehicle to another. Side-to-Side adjustment is desirable during sharp turns or other maneuvers in which different damping characteristics for shock absorbers 18 on opposite sides of the vehicle improves the ride. The damping response of the shock absorbers 18 can be changed in a matter of microseconds to provide nearly instantaneous changes in damping for potholes, dips in the road, or other driving conditions.

A plurality of sensors are also coupled to the controller 20. For example, the global change accelerometer 25 is coupled adjacent each ground engaging member 12. The accelerometer provides an output signal coupled to controller 20. The accelerometers 25 provide an output signal indicating movement of the ground engaging members and the suspension components 16 and 18 as the vehicle traverses different terrain.

Additional sensors may include a vehicle speed sensor 26, a steering sensor 28 and a chassis accelerometer 30 all having output signals coupled to the controller 20. Accelerometer 30 is illustratably a three-axis accelerometer located on the chassis to provide an indicating of forces on the vehicle during operation. Additional sensors include a brake sensor 32, a throttle position sensor 34, a wheel speed sensor 36, and a gear selection sensor 38. Each of these sensors has an output signal coupled to the controller 20.

Figure 2:
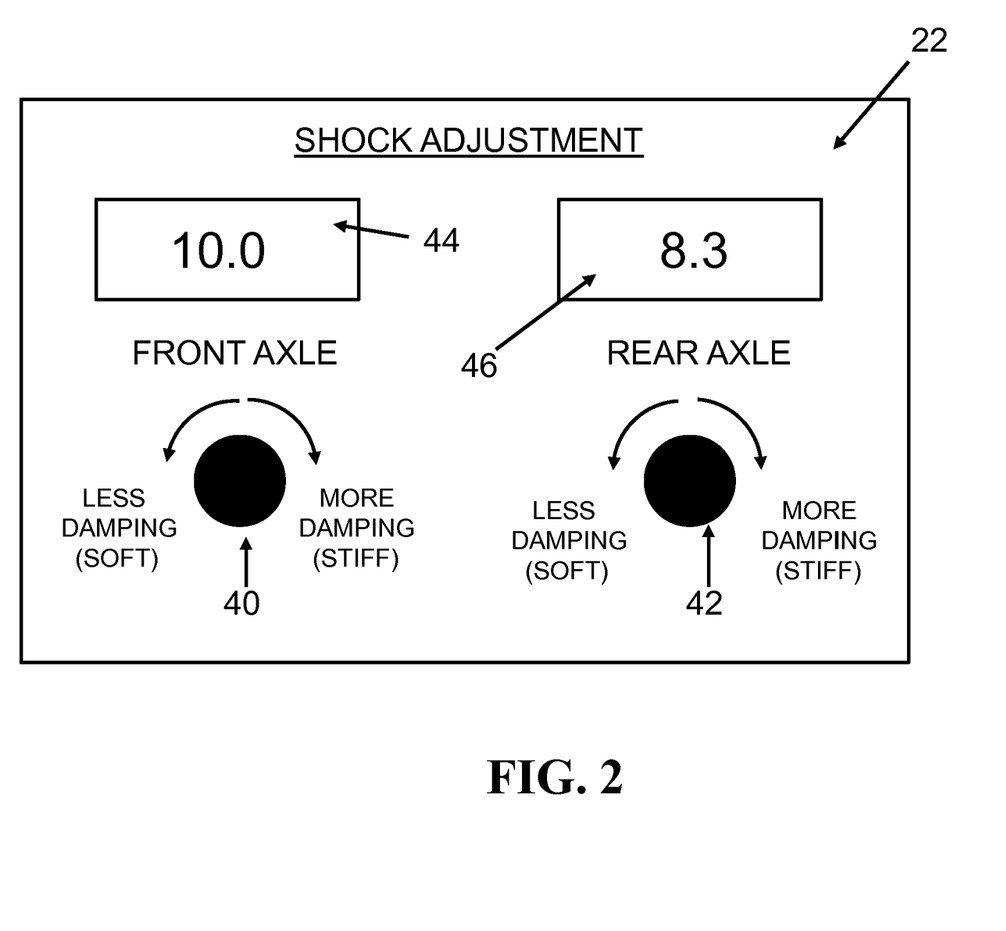
FIG. 2 illustrates an exemplary user interface for controlling damping at a front axle and a rear axle of the vehicle.

In an illustrated embodiment of the present disclosure, the user interface 22 shown in FIG. 2 includes manual user inputs 40 and 42 for adjusting damping of the front and rear axle shock absorbers 18. User interface 22 also includes first and second displays 44 and 46 for displaying the damping level settings of the front shock absorbers and rear shock absorbers, respectively. In operation, the driver or passenger of the vehicle can adjust user inputs 40 and 42 to provide more or less damping to the shock absorbers 18 adjacent the front axle and rear axle of the vehicle. In the illustrated embodiment, user inputs 40 and 42 are rotatable knobs. By rotating knob 40 in a counter clockwise direction, the operator reduces damping of the shock absorbers 18 adjacent the front axle of the vehicle. This provides a softer ride for the front axle. By rotating the knob 40 in a clockwise direction, the operator provides more damping on the shock absorbers 18 adjacent the front axle to provide a stiffer ride. The damping level for front axle is displayed in display 44. The damping level may be indicated by any desired numeric range, such as for example, between 0-10, with 10 being the most stiff and 0 the most soft.

The operator rotates knob 42 in a counter clockwise direction to reduce damping of the shock absorbers 18 adjacent the rear axle. The operator rotates the knob 42 in a clockwise direction to provide more damping to the shock absorbers 18 adjacent the rear axle of the vehicle. The damping level setting of the rear shock absorbers 18 is displayed in display window 46.

Figure 3:
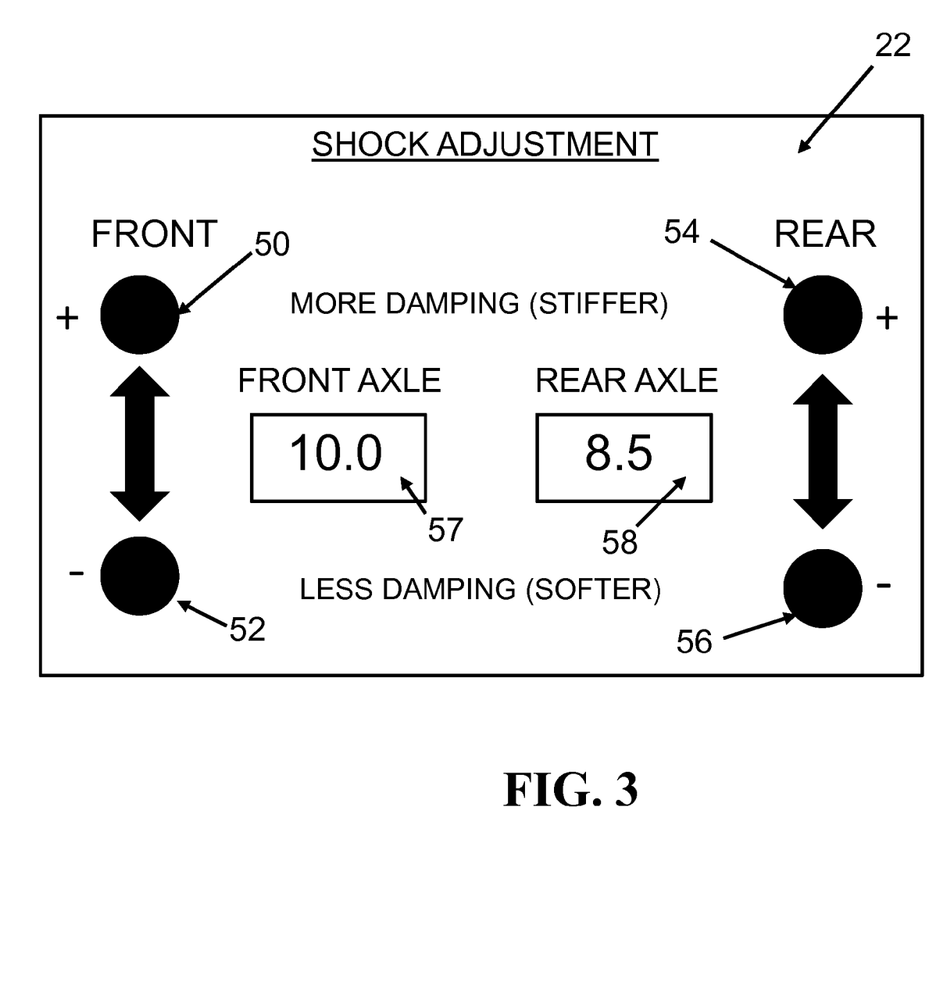
FIG. 3 illustrates another exemplary embodiment of a user interface for continuous damping control of shock absorbers of the vehicle.

Another embodiment of the user interface 22 is illustrated in FIG. 3. In this embodiment, push buttons 50 and 52 are provided for adjusting the damping level of shock absorbers 18 located adjacent the front axle and push buttons 54 and

56 are provided for adjusting the damping of shock absorbers 18 located adjacent rear axle. By pressing button 50, the operator increases the damping of shock absorbers 18 located adjacent the front axle and pressing button 52 reducing the damping of shock absorbers 18 located adjacent front axle. The damping level of shock absorbers 18 adjacent front axle is displayed within display window 57. As discussed above, the input control switches can be located any desired location on the vehicle. For example, in other illustrated embodiments, the user inputs are on a steering wheel, handle bar, or other steering control of the vehicle to facilitate actuation of the damping adjustment.

Similarly, the operator presses button 54 to increase damping of the shock absorbers located adjacent the rear axle. The operator presses button 56 to decrease damping of the shock absorbers located adjacent the rear axle. Display window 58 provides a visual indication of the damping level of shock absorbers 18 adjacent the rear axle. In other embodiments, different user inputs such as touch screen controls, slide controls, or other inputs may be used to adjust the damping level of shock absorbers 18 adjacent the front and rear axles. In other embodiments, different user inputs such as touch screen controls, slide controls, or other inputs may be used to adjust the damping level of shock absorbers 18 adjacent all four wheels at once.

Figure 4:
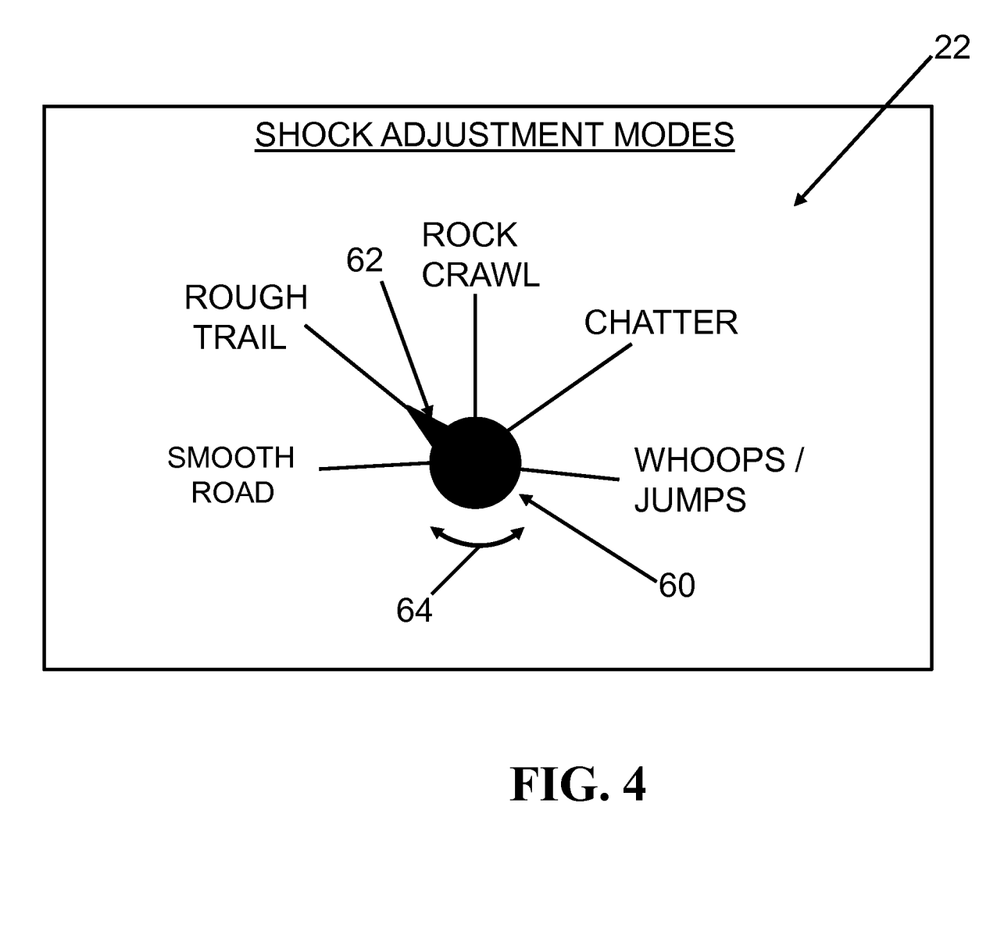
FIG. 4 illustrates yet another user interface for setting various modes of operation of the continuous damping control depending upon the terrain being traversed by the vehicle.

FIG. 4 illustrates yet another embodiment of the present disclosure in which the user interface 22 includes a rotatable knob 60 having a selection indicator 62. Knob 60 is rotatable as illustrated by double-headed arrow 64 to align the indicator 62 with a particular driving condition mode. In the illustrated embodiment, five modes are disclosed including a smooth road mode, a rough trail mode, a rock crawl mode, a chatter mode, and a whoops/jumps mode. Depending on the driving conditions, the operating rotates the control knob 60 to select the particular driving mode. Controller 20 automatically adjusts damping levels of adjustable shocks 18 adjacent front and rear axles of the vehicle based on the particular mode selected.

It is understood that various other modes may be provided including a sport mode, trail mode, or other desired mode. In addition, different modes may be provided for operation in two-wheel drive, four-wheel drive, high and low settings for the vehicle. Illustrative operation modes include:

Smooth Road Mode—Very stiff settings designed to minimize transient vehicle pitch and roll through hard acceleration, braking, and cornering.

Normal Trail Mode—Similar to smooth road mode, but a little bit softer set-up to allow for absorption of rocks, roots, and potholes but still have good cornering, accelerating, and braking performance.

Rock Crawl Mode—This would be the softest setting allowing for maximum wheel articulation for slower speed operation. In one embodiment, the rock crawl mode is linked to vehicle speed sensor 26.

High Speed Harsh Trail (Chatter)—This setting is between Normal Trail Mode and Rock Crawl Mode allowing for high speed control but very plush ride (bottom out easier).

Whoops and Jumps Mode—This mode provides stiffer compression in the dampers but less rebound to keep the tires on the ground as much as possible.

These modes are only examples one skilled in the art would understand there could be many more modes depending on the desired/intended use of the vehicle.

In addition to the driving modes, the damping control may be adjusted based on outputs from the plurality of sensors coupled with the controller 20. For instance, the setting of adjustable shock absorbers 18 may be adjusted based on vehicle speed from speed sensor 26 or outputs from the accelerometers 25 and 30. In vehicles moving slowly, the damping of adjustable shock absorbers 18 is reduced to provide a softer mode for a better ride. As vehicle's speed increases, the shock absorbers 18 are adjusted to a stiffer damping setting. The damping of shock absorbers 18 may also be coupled and controlled by an output from a steering sensor 28. For instance, if the vehicle makes a sharp turn, damping of shock absorbers 18 on the appropriate side of the vehicle may be adjusted instantaneously to improve ride.

The continuous damping control of the present disclosure may be combined with adjustable springs 16. The springs 16 may be a preload adjustment or a continuous dynamic adjustment based on signals from the controller 20.

An output from brake sensor 32 may also be monitored and used by controller 20 to adjust the adjustable shocks 18. For instance, during heavy braking, damping levels of the adjustable shocks 18 adjacent the front axle may be adjusted to reduce "dive" of the vehicle. In an illustrated embodiment, dampers are adjusted to minimize pitch by determining which direction the vehicle is traveling, by sensing an input from the gear selection sensor 38 and then adjusting the damping when the brakes are applied as detected by the brake sensor 32. In an illustrative example, for improved braking feel, the system increases the compression damping for shock absorbers 18 in the front of the vehicle and adds rebound damping for shock absorbers 18 in the rear of the vehicle for a forward traveling vehicle.

In another embodiment, an output from the throttle position sensor is used by controller 20 to adjust the adjustable shock absorbers 18 to adjust or control vehicle squat which occurs when the rear of the vehicle drops or squats during acceleration. For example, controller 20 may stiffen the damping of shock absorbers 18 adjacent rear axle during rapid acceleration of the vehicle. Another embodiment includes driver-selectable modes that control a vehicle's throttle map and damper settings simultaneously. By linking the throttle map and the CDC damper calibrations together, both the throttle (engine) characteristics and the suspension settings simultaneously change when a driver changes operating modes.

In another embodiment, a position sensor is provided adjacent the adjustable shock absorbers 18. The controller 20 uses these position sensors to stiffen the damping of the adjustable shocks 18 near the ends of travel of the adjustable shocks. This provides progressive damping control for the shock absorbers. In one illustrated embodiment, the adjustable shock position sensor is an angle sensor located on an A-arm of the vehicle suspension. In another embodiment, the adjustable shocks include built in position sensors to provide an indication when the shock is near the ends of its stroke.

In another illustrated embodiment, based on gear selection detected by gear selection sensor 38, the system limits the range of adjustment of the shock absorbers 18. For example, the damping adjustment range is larger when the gear selector is in low range compared to high range to keep the loads in the accepted range for both the vehicle and the operator.

Figure 5:
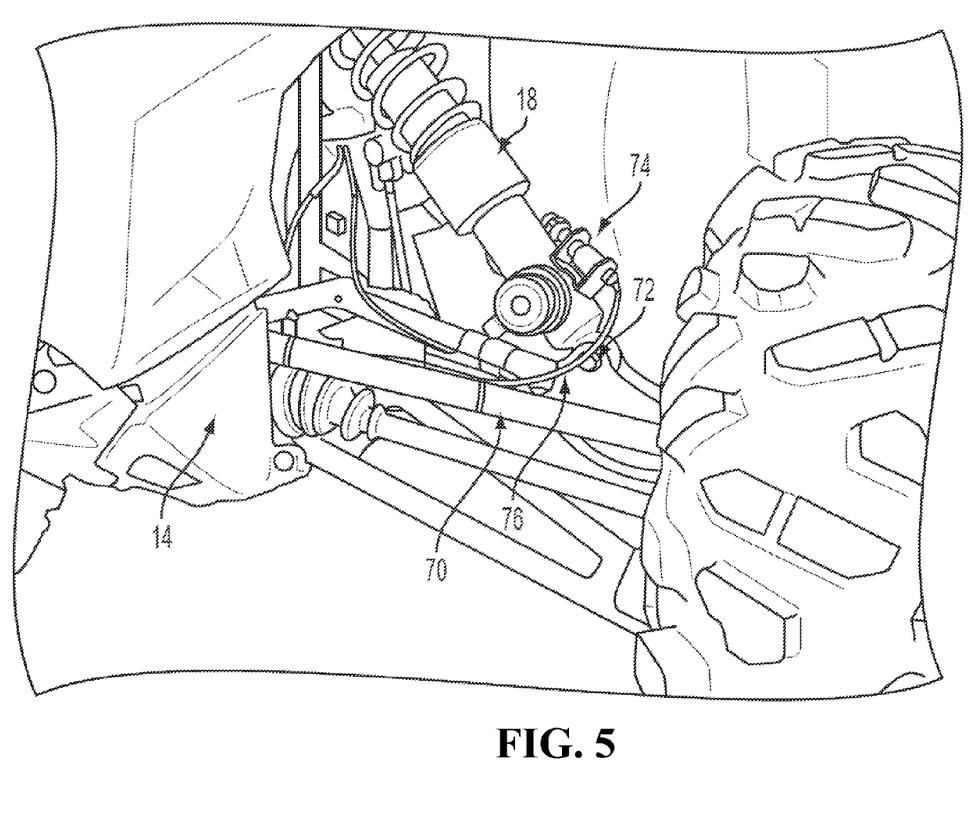
FIG. 5 illustrates an adjustable damping shock absorber coupled to a vehicle suspension.

FIG. 5 illustrates an adjustable shock absorber 18 mounted on an A-arm linkage 70 having a first end coupled to the vehicle frame 14 and a second end coupled to a wheel 12. The adjustable shock absorber 18 includes a first end 72 pivotably coupled to the A-arm 70 and a second end (not shown) pivotably coupled to the frame 14. A damping control activator 74 is coupled to controller 20 by a wire 76.

Demonstration Mode

In an illustrated embodiment of the present disclosure, a battery 80 is coupled to controller 20 as shown in FIG. 1. For operation in a demonstration mode in a showroom, the controller 20, user interface 22 and display 24 are activated using a key in an ignition of the vehicle or a wireless key to place the vehicle in accessory mode. This permits adjustment of the adjustable shock absorbers 18 without starting the vehicle. Therefore, the operation of the continuous damping control features of the present disclosure may be demonstrated to customers in a show room where it is not permitted to start the vehicle due to the enclosed space. This provides an effective tool for demonstrating how quickly the continuous damping control of the present disclosure works to adjust damping of front and rear axles of the vehicle.

As described herein, the system of the present disclosure includes four levels or tiers of operation. In the first tier, the adjustable shock absorbers 18 are adjusted by manual input only using the user interface 22 and described herein. In the second tier of operation, the system is semi-active and uses user inputs from the user interface 22 combined with vehicle sensors discussed above to control the adjustable shock absorbers 18. In the third tier of operation, input accelerometers 25 located adjacent the ground engaging members 12 and a chassis accelerometer 30 are used along with steering sensor 28 and shock absorber stroke position sensors to provide additional inputs for controller 20 to use when adjusting the adjustable shock absorbers 18. In the forth tier of operation, the controller 20 cooperates with a stability control system to adjust the shock absorbers 18 to provide enhanced stability control for the vehicle 10.

In another illustrated embodiment, vehicle loading information is provided to the controller 20 and used to adjust the adjustable shock absorbers 18. For instance, the number of passengers may be used or the amount of cargo may be input in order to provide vehicle loading information. Passenger or cargo sensors may also be provided for automatic inputs to the controller 20. In addition, sensors on the vehicle may detect attachments on the front or rear of the vehicle that affect handling of the vehicle. Upon sensing heavy attachments on the front or rear of the vehicle, controller 20 adjusts the adjustable shock absorbers 18. For example, when a heavy attachment is put on to the front of a vehicle, the compression damping of the front shocks may be increased to help support the additional load.

While embodiments of the present disclosure have been described as having exemplary designs, the present invention may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

The invention claimed is:

1. A damping control system for a vehicle having a suspension located between a plurality of ground engaging members and a vehicle frame, the damping control system comprising:
   a plurality of springs coupled between the ground engaging members and the frame;
   a plurality of shock absorbers coupled between the ground engaging members and the frame, at least one of the plurality of shock absorbers being an adjustable shock absorber having an adjustable damping characteristic;
   a controller coupled to each adjustable shock absorber to adjust the damping characteristic of each adjustable shock absorber;
   a user interface coupled to the controller and accessible to a driver of the vehicle, the user interface including at least one user input to permit manual adjustment of the damping characteristic of the at least one adjustable shock absorber during operation of the vehicle, the user interface providing a plurality of selectable driving condition modes, each driving condition mode having different damping characteristics for the at least one adjustable shock absorber based on a type of road or off-road trail on which the vehicle is expected to travel, wherein the user input permits manual selection of one of the driving condition modes, the controller adjusting damping characteristics of the at least one adjustable shock absorber based upon the manually selected driving condition mode, one of the driving condition modes being a first road mode in which the at least one adjustable shock absorber is set at a stiff damping level to minimize transient vehicle pitch and roll through hard acceleration, braking, and cornering and another one of the driving condition modes being a second mode in which the at least one adjustable shock absorber is set at a less stiff damping level compared to the first road mode to allow for absorption of bumps encountered by the vehicle,
   the at least one adjustable shock absorber includes a moveable piston located within a cylinder, and further comprising a position sensor to indicate a position of the piston of the adjustable shock absorber, the position sensor having an output coupled to the controller, the controller being programmed to stiffen a damping characteristic of the at least one adjustable shock absorbers near an end of a range of travel of the piston within the cylinder to provide progressive damping control.

2. The system of claim 1, wherein the ground engaging members include at least one of wheels, skis, guide tracks and treads.

3. The system of claim 1, wherein the plurality of springs include at least one of coil springs, leaf springs, air springs and gas springs.

4. The system of claim 1, wherein the plurality of springs and the plurality of shock absorbers are coupled to an A-arm linkage of the suspension.

5. The system of claim 1, wherein one of the plurality of springs and one of the plurality of shock absorbers are located adjacent each of the ground engaging members of the vehicle.

6. The system of claim 5, wherein the vehicle has four wheels used as the ground engaging members, four springs, and four adjustable shock absorbers, with one spring and one adjustable shock absorber being located adjacent each of the four wheels.

7. The system of claim 1, further comprising an accelerometer coupled to the vehicle adjacent each ground engaging member, each accelerometer providing an output signal coupled to the controller and used to adjust the damping characteristic of the at least one adjustable shock absorber, the output signal indicating movement of the associated ground engaging member upon movement of the vehicle.

8. The system of claim 1, wherein the user interface is integrated with a display on a dashboard of the vehicle.

9. The system of claim 1, wherein the at least one user input of the user interface is located on one of a steering wheel, a handle bar, or a steering controller of the vehicle to facilitate adjustment of the damping characteristic of the at least one adjustable shock absorber by a driver of the vehicle.

10. The system of claim 1, wherein at least one front adjustable shock absorber is coupled between the ground engaging members and the frame at a front portion of the vehicle and at least one rear adjustable shock absorber is coupled between the ground engaging members and the frame at a rear portion of the vehicle, and wherein the controller controls damping characteristics of the front and rear adjustable shock absorbers independently based signals received from the user inputs of the user interface.

11. The system of claim 10, wherein the user interface includes first and second manual user inputs for independently adjusting damping characteristics of the front and rear adjustable shock absorbers, respectively.

12. The system of claim 11, wherein the user interface includes first and second display portions to display information related to damping characteristics of the front and rear adjustable shock absorbers, respectively.

13. The system of claim 11, wherein the first and second user inputs are first and second rotatable knobs, and wherein rotation of the first and second knobs in a first direction reduces a damping level of the front and rear adjustable shock absorbers, respectively, to provide a softer ride and rotation of the first and second knobs in second direction, opposite the first direction, increases a damping level of the front and rear adjustable shock absorbers, respectively, to provide a stiffer ride.

14. The system of claim 11, wherein the first and second manual user inputs include at least one of a touch screen control, a slide control, and a push button to adjust damping characteristics of the front and rear adjustable shock absorbers.

15. The system of claim 1, further comprising at least one sensor selected from a vehicle speed sensor, a steering sensor, a chassis accelerometer, a throttle position sensor, a wheel speed sensor and a gear selection sensor, the at least one sensor having an output signal coupled to the controller, the controller using the sensor output signals to adjust the damping characteristics of the at least one adjustable shock absorber based on driving conditions of the vehicle.

16. The system of claim 15, wherein first side and second side front adjustable shock absorbers are coupled between the ground engaging members and the frame at the front portion of the vehicle and first side and second side rear adjustable shock absorbers are coupled between the ground engaging members and the frame at the rear portion of the vehicle, and wherein the controller controls damping levels of the first side front adjustable shock absorber, the second side front adjustable shock absorber, the first side rear adjustable shock absorber, the second side rear adjustable shock absorber independently based signals received from the user inputs of the user interface and the at least one sensor.

17. The system of claim 15, wherein the controller sets a damping characteristic adjustment range for the at least one adjustable shock absorber, the least one user input of the user interface providing manual adjustment of the damping characteristic of the at least one adjustable shock absorber within the damping characteristic adjustment range.

18. The system of claim 1, wherein the user interface also includes a display to display information related to the damping characteristic of the at least one adjustable shock absorber.

19. The system of claim 18, wherein the display information includes at least one numerical value related to the damping characteristic of the at least one adjustable shock absorber.

20. The system of claim 1, wherein one of the driving condition modes of operation is a rock crawl mode in which the at least one adjustable shock absorber is set at a soft damping level to allow for increased articulation of the ground engaging members during slow speed operation of the vehicle.

21. The system of claim 20, wherein one of the driving condition modes is a high speed harsh trail in which the at least one adjustable shock absorber is set at a damping level between normal trail mode damping level and rock crawl mode damping level.

22. The system of claim 21, wherein one of the driving condition modes is a whoops and jumps mode in which the at least one adjustable shock absorber is set at a damping level to provide stiffer compression but less rebound than the other driving condition modes.

23. The system of claim 1, wherein the plurality of springs have an adjustable spring force.

24. The system of claim 1, further comprising a vehicle speed sensor having an output coupled to the controller, the controller being programmed to reduce a damping level of the at least one adjustable shock absorber as vehicle speed decreases and to increase a damping level of the at least one adjustable shock absorber as the vehicle speed increases.

25. The system of claim 1, further comprising a steering sensor having an output coupled to the controller, the controller selectively adjusting the damping characteristics of adjustable shock absorbers adjacent a first side of the vehicle and a second side of the vehicle independently based upon the steering sensor detecting a sharp turn of the vehicle.

26. A damping control system for a vehicle having a suspension located between a plurality of ground engaging members and a vehicle frame, the damping control system comprising:
a plurality of springs coupled between the ground engaging members and the frame;
a plurality of shock absorbers coupled between the ground engaging members and the frame, at least one of the plurality of shock absorbers being an adjustable shock absorber having an adjustable damping characteristic;
a controller coupled to each adjustable shock absorber to adjust the damping characteristic of each adjustable shock absorber; and
a user interface coupled to the controller and accessible to a driver of the vehicle, the user interface including at least one user input to permit manual adjustment of the damping characteristic of the at least one adjustable shock absorber during operation of the vehicle, the user interface providing a plurality of selectable driving condition modes, each driving condition mode having different damping characteristics for the at least one adjustable shock absorber based on a type of road or off-road trail on which the vehicle is expected to travel, each driving condition mode further including a throttle map that defines a relationship between a throttle input and a throttle, and wherein the user input permits manual selection of one of the driving condition modes, the controller adjusting damping characteristics of the at least one adjustable shock absorber based upon the manually selected driving condition mode, the controller adjusting the throttle map based upon the manually selected driving condition mode, one of the driving condition modes being a smooth road mode in which the at least one adjustable shock absorber is set at a stiff damping level to minimize transient vehicle pitch and roll through hard acceleration, braking, and cornering and another one of the driving condition modes being a normal trail mode in which the at least one adjustable shock absorber is set at a less stiff damping level compared to the smooth road mode to allow for absorption of bumps encountered by the vehicle, the at least one adjustable shock absorber includes a moveable piston located within a cylinder, and further comprising a position sensor to indicate a position of the piston of the adjustable shock absorber, the position sensor having an output coupled to the controller, the controller being programmed to stiffen a damping characteristic of the at least one adjustable shock absorbers near an end of a range of travel of the piston within the cylinder to provide progressive damping control.

27. A damping control system for a vehicle having a suspension located between a plurality of ground engaging members and a vehicle frame, the damping control system comprising:
a plurality of springs coupled between the ground engaging members and the frame;
a plurality of shock absorbers coupled between the ground engaging members and the frame, at least one of the plurality of shock absorbers being an adjustable shock absorber having an adjustable damping characteristic;
a controller coupled to each adjustable shock absorber to adjust the damping characteristic of each adjustable shock absorber;
a user interface coupled to the controller and accessible to a driver of the vehicle, the user interface including at least one user input to permit manual adjustment of the damping characteristic of the at least one adjustable shock absorber during operation of the vehicle; and
a battery coupled to the controller, the controller being programmed to operate in a demonstration mode activated by a key of the vehicle to permit adjustment of the at least one adjustable shock absorber without starting an engine of the vehicle.

28. The system of claim 1, further comprising a stability control system coupled to the controller, the controller adjusting damping characteristics of the at least one adjustable shock absorber based on output signals from the stability control system to provide enhanced stability control for the vehicle.

29. The system of claim 1, further a vehicle loading sensor having an output coupled to the controller, the controller adjusting damping characteristics of the at least one adjustable shock absorber based on output signals from the vehicle loading sensor.

30. The system of claim 1, further comprising a throttle position sensor having an output coupled to the controller, the controller increasing damping of at least one adjustable shock absorber adjacent a rear portion of the vehicle during acceleration of the vehicle to reduce vehicle squat.

31. The system of claim 30, further comprising a driver-selectable mode on the user interface to control a throttle map of the vehicle and settings for the damping characteristic of the at least one shock absorber simultaneously.

32. The system of claim 27, wherein the user interface provides a plurality of driving condition modes, each driving condition mode having different damping characteristics for the at least one adjustable shock absorber based on a type of road or off-road trail on which the vehicle is expected to travel, and wherein the controller permits selection of any of the plurality of driving condition modes and automatically adjusts damping characteristics of the at least one adjustable shock absorber based upon the selected driving condition mode without starting the engine of the vehicle when operating in the demonstration mode.

33. The system of claim 27, wherein the user interface provides a plurality of driving condition modes, each driving condition mode having different damping characteristics for the at least one adjustable shock absorber based on a type of road or off-road trail on which the vehicle is expected to travel, and wherein the user input permits selection of one of the driving condition modes, the controller automatically adjusting damping characteristics of the at least one adjustable shock absorber based upon the selected driving condition mode.

34. The system of claim 33, wherein one of the driving condition modes is a smooth road mode in which the at least one adjustable shock absorber is set at a stiff damping level to minimize transient vehicle pitch and roll through hard acceleration, braking, and cornering; another one of the driving condition modes being a normal trail mode in which the at least one adjustable shock absorber is set at a less stiff damping level compared to the smooth road mode to allow for absorption of bumps encountered by the vehicle; yet another one of the driving condition modes of operation is a rock crawl mode in which the at least one adjustable shock absorber is set at a soft damping level to allow for increased articulation of the ground engaging members during slow speed operation of the vehicle; still another one of the driving condition modes is a high speed harsh trail in which the at least one adjustable shock absorber is set at a damping level between normal trail mode damping level and rock crawl mode damping level; and a further one of the driving condition modes is a whoops and jumps mode in which the at least one adjustable shock absorber is set at a damping level to provide stiffer compression but less rebound than the other driving condition modes.

* * * * *